US012276926B2

(12) United States Patent
Arakawa

(10) Patent No.: US 12,276,926 B2
(45) Date of Patent: Apr. 15, 2025

(54) DEVELOPMENT DEVICE, IMAGE FORMING APPARATUS, AND DEVELOPMENT METHOD

(71) Applicant: KYOCERA Document Solutions Inc., Osaka (JP)

(72) Inventor: Takeshi Arakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/497,980

(22) Filed: Oct. 30, 2023

(65) Prior Publication Data

US 2024/0142897 A1 May 2, 2024

(30) Foreign Application Priority Data

Oct. 31, 2022 (JP) ................................ 2022-174765

(51) Int. Cl.
*G03G 15/09* (2006.01)
*G03G 9/08* (2006.01)
*G03G 9/107* (2006.01)

(52) U.S. Cl.
CPC ....... *G03G 15/0921* (2013.01); *G03G 9/0815* (2013.01); *G03G 9/1087* (2020.08)

(58) Field of Classification Search
CPC ........... G03G 15/0914; G03G 15/0921; G03G 15/0928; G03G 2215/0858; G03G 2215/0861; G03G 2215/0863; G03G 9/083; G03G 9/0831; G03G 9/0832
See application file for complete search history.

(56) References Cited

U.S. PATENT DOCUMENTS

| | | | | | |
|---|---|---|---|---|---|
| 5,607,806 | A * | 3/1997 | Kanbayashi ....... | G03G 9/09716 430/108.3 |
| 6,385,423 | B1 * | 5/2002 | Kai .................... | G03G 15/0921 399/277 |
| 2012/0288791 | A1 * | 11/2012 | Sakashita ........... | G03G 9/08797 430/108.4 |

FOREIGN PATENT DOCUMENTS

| | | | |
|---|---|---|---|
| JP | 2006-106413 A | | 4/2006 |
| JP | 2012154991 A | * | 8/2012 |

OTHER PUBLICATIONS

Machine Translation of JP-2012154991-A. Aug. 16, 2012. (Year: 2012).*

* cited by examiner

*Primary Examiner* — Carla J Therrien
(74) *Attorney, Agent, or Firm* — Studebaker Brackett PLLC

(57) ABSTRACT

A development device includes an accommodation section that accommodates a developer and a developer bearing member that carries the developer in the accommodation section. The developer bearing member includes a magnetic member and a sleeve provided around the magnetic member rotatably around the magnetic member. The sleeve includes a metal substrate with a surface having projections and recesses and a plating layer covering the surface of the metal substrate. The plating layer contains chromium and cobalt. The developer contains a toner and the toner includes toner particles. The toner particles each include a toner mother particle and external additive particles attached to the surface of the toner mother particle. The toner mother particles contain a binder resin and a magnetic powder. The external additive particles include alumina particles with surfaces that are hydrophobized.

8 Claims, 5 Drawing Sheets

DEVELOPMENT DEVICE, IMAGE FORMING APPARATUS, AND DEVELOPMENT METHOD

INCORPORATION BY REFERENCE

The present application claims priority under 35 U.S.C. § 119 to Japanese Patent Application No. 2022-174765, filed on Oct. 31, 2022. The contents of this application are incorporated herein by reference in their entirety.

BACKGROUND

The present disclosure relates to a development device, an image forming apparatus, and a development method.

There are known image forming apparatuses using a one-component magnetic developer. In order to reduce running costs, it is important to extend the lifetime of members of the image forming apparatuses and reduce the number of times of replacement of each member. Various studies are being conducted for extending the lifetime of a development device which is one of the members.

As one example, an image formation method is proposed in which an electrostatic latent image is developed by moving a toner held by a cylindrical toner bearing member from the toner bearing member. The toner bearing member includes at least a substrate and a cylindrical development sleeve including a plating layer.

SUMMARY

According to an aspect of the present disclosure, a development device includes an accommodation section that accommodates a developer and a developer bearing member that carries the developer in the accommodation section. The developer bearing member includes a magnetic member and a sleeve provided around the magnetic member rotatably around the magnetic member. The sleeve includes a metal substrate with a surface having projections and recesses and a plating layer covering the surface of the metal substrate. The plating layer contains chromium and cobalt. The developer contains a toner and the toner includes toner particles. The toner particles each include a toner mother particle and external additive particles attached to a surface of the toner mother particle. The toner mother particles contain a binder resin and a magnetic powder. The external additive particles include alumina particles with surfaces that are hydrophobized.

According to another aspect of the present disclosure, an image forming apparatus includes the aforementioned development device.

According to still another aspect of the present disclosure, a development method includes developing an electrostatic latent image with the aforementioned developer using the aforementioned development device.

DETAILED DESCRIPTION

Figure 1:
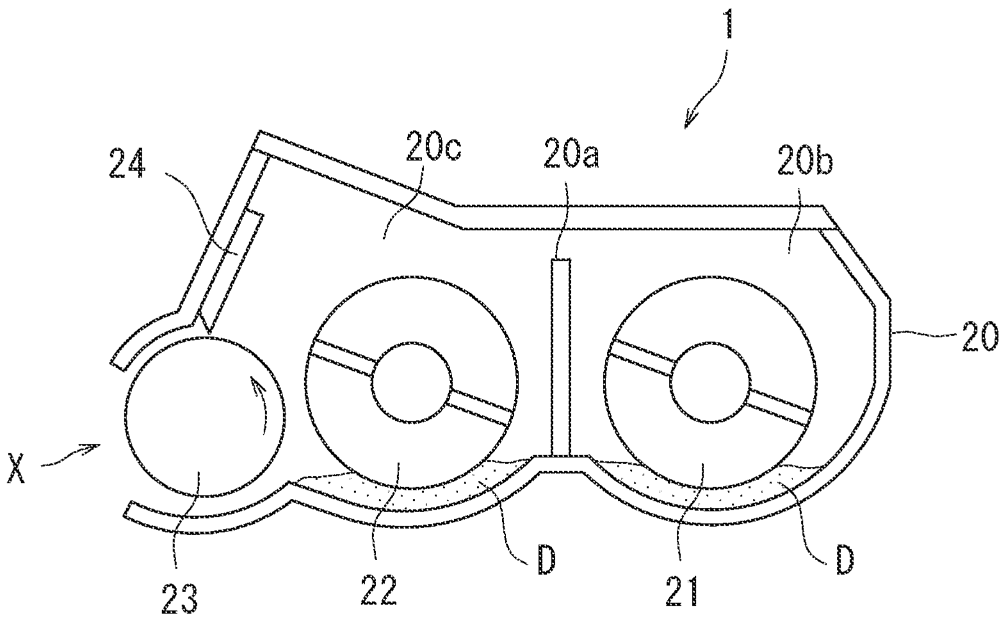
FIG. 1 is a diagram illustrating an example of a development device according to a first embodiment of the present disclosure.

The following describes embodiments of the present disclosure. Terms used in the present specification are explained first. A toner contained in a developer is a collection (e.g., a powder) of toner particles. A magnetic powder is a collection (e.g., a powder) of magnetic particles. An external additive is a collection (e.g., a powder) of external additive particles. Unless otherwise stated, evaluation results (specific examples include values indicating shape or physical properties) for a powder are number averages of values as measured for a suitable number of particles selected from the powder. Unless otherwise stated, values for ten-point average roughness Rz are values as measured in accordance with the "Japanese Industrial Standards (JIS) B0601:2013". Values for cumulative value at 50% (also referred to below as "$D_{50}$") in a particle size distribution in terms of volume are median diameters as measured using a laser diffraction/scattering type particle size distribution analyzer (e.g., "LA-950", product of HORIBA, Ltd.) unless otherwise stated. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter of a powder is a number average value of equivalent circle diameters of 100 primary particles of the powder, for example. The amount of charge (unit: μC/g) is a value as measured using a compact suction-type charge measuring device (e.g., "MODEL 212HS", product of TREK, INC.) in an environment at a temperature of 25° C. and a relative humidity of 50% unless otherwise stated. The level of hydrophobicity (or the level of hydrophilicity) can be expressed by a contact angle (wettability of water) of a water drop, for example. The larger the contact angle of a water droplet is, the higher the hydrophobicity is. Hydrophobizing treatment is a treatment for increasing hydrophobicity. The term "(meth)acryl" is used as a generic term for both acryl and methacryl. One type of each component described in the present specification may be used independently, or two or more types of the component may be used in combination. Terms used in the present specification have been explained so far. Note that the drawings schematically illustrate elements of configuration in order to facilitate understanding. Properties such as the size, number, and shape of each element of configuration illustrated in the drawings may differ from actual properties in order to facilitate preparation of the drawings. The present disclosure is not limited to the following embodiments and illustrated examples, and can be practiced within a scope of objects of the present disclosure with alterations made as appropriate.

First Embodiment: Development Device

The following describes a development device according to a first embodiment of the present disclosure. The development device of the first embodiment includes an accommodation section and a developer bearing member. The accommodation section accommodates a developer. The developer bearing member carries the developer in the accommodation section. The developer bearing member includes a magnetic member and a sleeve. The sleeve is provided around the magnetic member rotatably around the magnetic member. The sleeve includes a metal substrate and a plating layer. The metal substrate has a surface with projections and recesses. The plating layer covers the surface of the metal substrate. The plating layer contains chromium and cobalt. The developer contains a toner. The toner includes toner particles. The toner particles each include a toner mother particle and external additive particles. The external additive particles are attached to the surface of the toner mother particle. The toner mother particles contain a binder resin and a magnetic powder. The external additive particles include alumina particles with surfaces that are hydrophobized. In the following, the "alumina particles with surfaces that are hydrophobized" may be also referred to below as "specific alumina particles".

As a result of having the above features, the development device of the first embodiment can form images with desired image density under less variation in amount of transported developer (also referred to below as "developer transport amount") even when printing many sheets. The reasons thereof are inferred as below.

In the first embodiment, the sleeve of the developer bearing member includes a plating layer containing chromium and cobalt. Projections and recesses that correspond to the projections and the recesses of the surface of the metal substrate are formed in the surface of the sleeve of the developer bearing member. As a result of the developer being held on the projections and in the recesses in the surface of the developer bearing member, the developer is transported by the developer bearing member. The plating layer containing chromium and cobalt has relatively high hardness. As such, even after printing many sheets, the plating layer of the sleeve is hardly abraded with a result that the projections and the recesses in the surface of the sleeve are maintained. As a result, the developer transport amount varies less in the development device of the first embodiment even when printing many sheets.

When the developer is a one-component developer, for example, contact of the toner being the developer with the surface of the sleeve charges the toner. Typically, when the sleeve includes a plating layer on the surface thereof, the toner tends to be hardly charged. In view of the foregoing, in the first embodiment, the plating layer of the sleeve contains chromium and cobalt. Furthermore, in the first embodiment, the toner particles included in the toner includes the specific alumina particles as the external additive particles. From the above, the toner can be charged enough to the desired amount of charge upon contact between the toner and the surface of the sleeve. As a result, the development device of the first embodiment can form images with desired image density even when printing many sheets.

The reasons have been described so far why the development device of the first embodiment can form images with desired image density under less variation in developer transport amount even when printing many sheets.

In the following, a development device 1, which is an example of the development device of the first embodiment, is described with reference to FIG. 1. FIG. 1 is a diagram illustrating the development device 1. The development device 1 illustrated in FIG. 1 includes an accommodation section 20, a first stirring screw 21, a second stirring screw 22, a developer bearing member 23, a restriction blade 24, and a developer D.

The accommodation section 20 accommodates the developer D. The developer D is a magnetic one-component magnetic developer. The developer D is constituted by a toner including toner particles. The accommodation section 20 has an opening X. The first stirring screw 21, the second stirring screw 22, the developer bearing member 23, and the restriction blade 24 are arranged in the accommodation section 20. The accommodation section 20 is a developer container, for example.

The interior of the accommodation section 20 is divided into a first stirring chamber 20*b* and a second stirring chamber 20*c* by a partition wall 20*a* extending in the longitudinal direction (direction perpendicular to the paper surface of FIG. 1) of the accommodation section 20. The first stirring screw 21 is disposed in the first stirring chamber 20*b*. The second stirring screw 22 is disposed in the second stirring chamber 20*c*. The partition wall 20*a* does not extend to the opposite ends of the accommodation section 20 in the longitudinal direction of the accommodation section 20. Spaces between the opposite ends and the partition wall 20*a* serve as paths through which the developer D moves between the first stirring chamber 20*b* and the second stirring chamber 20*c*.

The first stirring screw 21 transports the developer D in a first transport direction (a direction perpendicular to the paper surface of FIG. 1 and a direction from back to front of the paper surface) from one side to the other side of the developer bearing member 23 in the axial direction thereof while stirring the developer D in the first stirring chamber 20*b*. The second stirring screw 22 transports the developer D in a second direction opposite to the first direction while stirring the developer D in the second stirring chamber 20*c*. The second stirring screw 22 supplies the developer D to the developer bearing member 23 while transporting the developer D in the second transport direction.

The developer bearing member 23 includes a magnetic member 32 (see FIG. 2) and a sleeve 33 (see FIG. 2) provided around the magnetic member 32 rotatably around the magnetic member 32. The sleeve 33 of the developer bearing member 23 is rotatable in an arrow direction in FIG. 1 (anticlockwise direction in FIG. 1). Note that the configuration of the developer bearing member 23 is described later in detail. The developer D is attracted by magnetic force of the magnetic member 32 of the developer bearing member 23 and carried on the surface of the sleeve 33 of the developer bearing member 23. In the manner described above, the developer bearing member 23 carries the developer D in the accommodation section 20 on the surface thereof (e.g., the outer circumferential surface of the developer bearing member 23, and more specifically, the outer circumferential surface of the sleeve 33).

The restriction blade 24 restricts the amount of the developer D to be attached to the surface of the developer bearing member 23. This also restricts the amount of the developer D to be supplied to an image bearing member 2 in FIG. 6. The restriction blade 24 is constituted by a magnetic material. The restriction blade 24 is disposed to form a specific gap between the tip end thereof and the developer bearing member 23. The width of the specific gap is at least 0.2 mm and no greater than 0.3 mm, for example. The amount of the developer D attached to the surface of the developer bearing member 23 (corresponding to the amount of the developer D transported, i.e., the developer transport amount) is restricted by the magnetic field generated in the specific gap between the restriction blade 24 and the developer bearing member 23. Thus, a thin layer of the developer D is formed on the surface of the developer bearing member 23.

Upon contact of toner particles 60 (see FIG. 5) of the toner constituting the developer D with the sleeve 33 of the developer bearing member 23, the toner is charged. As such, the shape and material of the sleeve 33 and the constitution of the outermost layers of the toner particles 60 (e.g., the type of external additive particles 62 (see FIG. 5)) affect chargeability of the toner. As described previously, in the first embodiment, a plating layer 35 (see FIG. 2) of the sleeve 33 contains chromium and cobalt and the external additive particles 62 include the specific alumina particles. As such, the toner can be charged enough to the specific amount of charge upon contact between the sleeve 33 and the toner particles 60. Note that the toner is also charged by contact between the toner particles 60 in the accommodation section 20 (e.g., the first stirring chamber 20*b* and the second stirring chamber 20*c*).

When the development device 1 is included in an image forming apparatus 100 (see FIG. 6), the developer bearing member 23 is located opposite to the image bearing member 2 (see FIG. 6) with the opening X therebetween. The charged toner particles 60 are supplied to the image bearing member 2 by rotation of the sleeve 33 of the developer bearing member 23. As a result, the toner particles 60 are attached to an electrostatic latent image formed on the surface of the image bearing member 2. Thus, a toner image is formed on the surface of the image bearing member 2. In the manner described above, the electrostatic latent image formed on the surface of the image bearing member 2 is developed into the toner image.

The linear velocity of the sleeve 33 of the developer bearing member 23 is not limited particularly, and can be set to no greater than 250 mm/sec, for example. Typically, when the linear velocity of a sleeve is as low such as no greater than 250 mm/sec, the toner is hardly charged and image density of formed images tends to be low. However, the development device 1 of the first embodiment can charge the toner enough to the desired amount of charge as described previously. Therefore, in the first embodiment, the toner can be charged enough to desired amount of charge and images with desired image density can be formed even when the linear velocity of the sleeve 33 is as low as no greater than 250 mm/sec.

Figure 2:
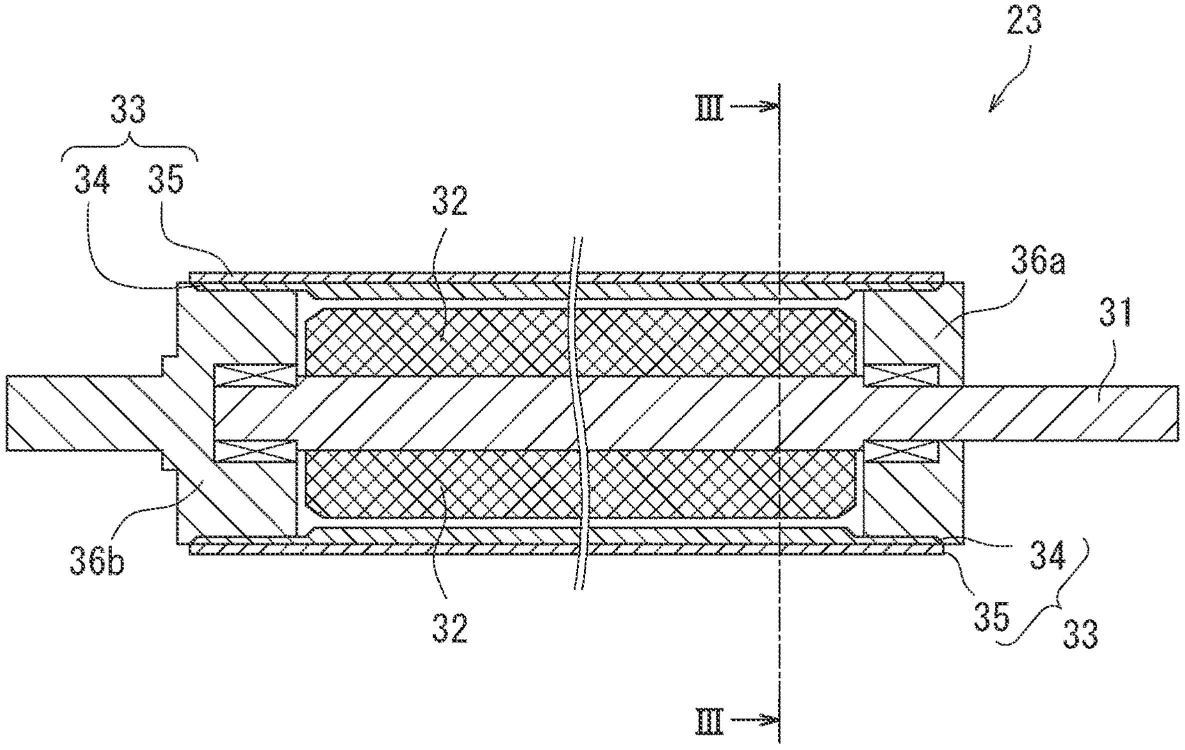
FIG. 2 is a diagram illustrating a developer bearing member included in the development device illustrated in FIG. 1.
Figure 3:
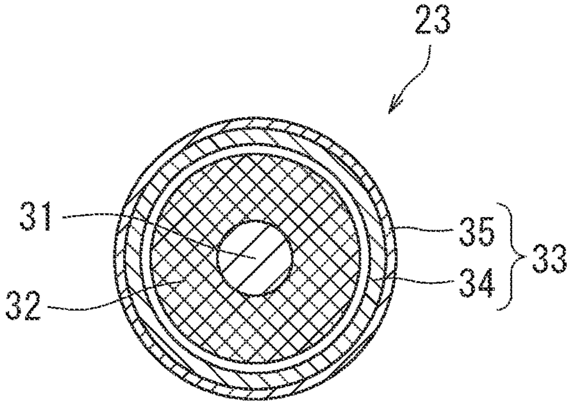
FIG. 3 is a cross-sectional view of the developer bearing member taken along a line in FIG. 2.
Figure 4:
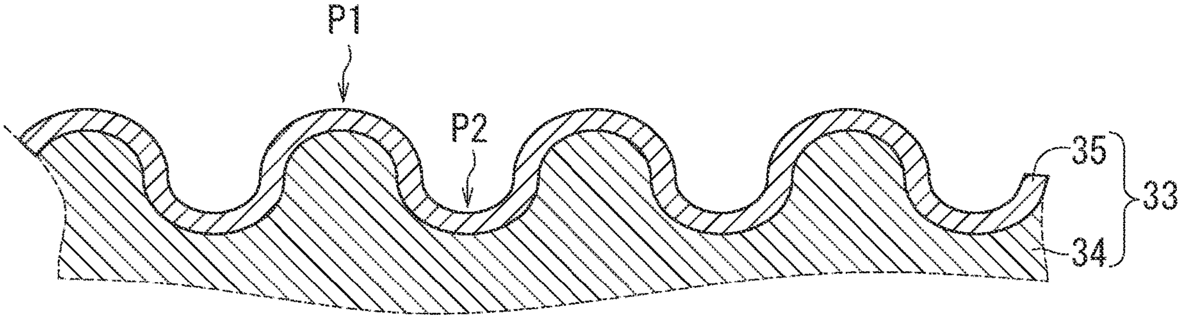
FIG. 4 is an enlarged view of a surface portion of a sleeve of the developer bearing member illustrated in FIG. 3.

The configuration of the developer bearing member 23 is described next in detail with reference to FIGS. 2 to 4. FIG. 2 is a diagram illustrating the developer bearing member 23 included in the development device 1 illustrated in FIG. 1. FIG. 3 is a cross-sectional view of the developer bearing member 23 taken along a line in FIG. 2. FIG. 4 is an enlarged view of the surface portion of the sleeve 33 of the developer bearing member 23 illustrated in FIG. 3.

As illustrated in FIGS. 2 and 3, the developer bearing member 23 includes a shaft 31, a magnetic member 32, a sleeve 33, and flanges 36*a* and 36*b*. The sleeve 33 includes a metal substrate 34 and a plating layer 35. The metal substrate 34 and the plating layer each are cylindrical in shape, for example. The developer bearing member 23 is a development roller, for example.

The magnetic member 32 is fixed to the shaft 31 and supported non-rotatably around the shaft 31. The magnetic member 32 is disposed inside the sleeve 33 (inside the cylinder). The magnetic member 32 is constituted by a magnetic material. The magnetic member 32 has a magnetic pole at least on the surface layer portion thereof. Examples of the magnetic pole of the magnetic member 32 includes an N pole and an S pole based on a permanent magnet.

The sleeve 33 is located at the surface layer portion of the developer bearing member 23. For example, the outer circumferential surface of the sleeve 33 constitutes the outer circumferential surface of the developer bearing member 23. The sleeve 33 is rotatably supported around the shaft 31. In detail, the shaft 31 and the sleeve 33 are connected to each other by means of the flanges 36*a* and 36*b* so that the sleeve 33 is rotatable around the magnetic member 32 that is non-rotatable. Furthermore, a gap is formed between the magnetic member 32 and the sleeve 33 so that the sleeve 33 can rotate around the magnetic member 32 that is non-rotatable. In the above configuration, the sleeve 33 can rotate in the circumferential direction (an arrow direction in FIG. 1) of the shaft 31.

As described previously, the sleeve 33 includes a metal substrate 34 and a plating layer 35. The metal substrate 34 is an aluminum substrate, for example.

The plating layer 35 covers the surface (e.g., the outer circumferential surface) of the metal substrate 34. In the example illustrated in FIGS. 2 and 3, the plating layer 35 is formed over the entirety of the outer circumferential surface of the metal substrate 34. However, it is only required that the plating layer 35 is formed in at least a region of the outer circumferential surface of the metal substrate 34 where the developer D is carried. An example of methods for covering the surface of the metal substrate 34 with the plating layer 35 is plating of the metal substrate 34. Examples of the plating method include electroless plating and electrolytic plating.

As illustrated in FIG. 4, the surface (e.g., the outer circumferential surface) of the metal substrate 34 has projections and recesses. The surface (e.g., the outer circumferential surface) of the plating layer 35 has projections and recesses corresponding to the projections and the recesses formed in the surface (e.g., the outer circumferential surface) of the metal substrate 34. Specifically, projections P1 corresponding to the projections formed on the surface of the metal substrate 34 and recesses P2 corresponding to the recesses formed in the surface of the metal substrate 34 are formed in the surface of the plating layer 35. With the above projections and recesses, a toner thin layer is stably formed on the surface of the sleeve 33, thereby facilitating transport of the developer D by the developer bearing member 23. Furthermore, with the above projections and recesses, the contact area between the sleeve 33 and the toner particles 60 contained in the developer D increases, thereby facilitating charging of the toner particles 60. As a result, the image forming apparatus of the present disclosure can form images with desired image density even when printing many sheets.

The projections and the recesses in the surface of the metal substrate 34 can be formed by blasting, for example. In terms of stably charging the toner particles 60 and forming images with desired image density, the projections and the recesses in the surface of the metal substrate 34 are projections and recesses that provide the surface of the metal substrate 34 having a ten-point average roughness Rz of preferably at least 1.7 μm and no greater than 10.0 μm, and more preferably at least 6.0 μm and no greater than 8.0 μm. For the same purpose as above, the projections and the recesses in the surface of the sleeve 33 are projections and recesses that provide the surface of the sleeve 33 having a ten-point average roughness Rz of preferably at least 1.7 μm and no greater than 10.0 μm, and more preferably at least 6.0 μm and no greater than 8.0 μm.

The plating layer 35 contains chromium and cobalt. That is, the plating layer 35 is a plating layer of chromium and cobalt. Preferably, chromium and cobalt are contained in the plating layer 35 in a mixed state. Furthermore, the plating layer 35 is preferably a single-layer plating layer containing chromium and cobalt. The plating layer of chromium and cobalt can more stably charge the toner than any other plating layers (e.g., a nickel plating layer and a chromium plating layer).

The plating layer 35 may be constituted by only chromium and cobalt. However, the plating layer 35 may further contain a material other than chromium and cobalt. The plating layer 35 has a total percentage content of the chromium and the cobalt of preferably at least 80% by mass, more preferably at least 90% by mass, and further preferably at least 95% by mass. The total percentage content of the chromium and the cobalt in the plating layer 35 may be 100% by mass or no greater than 97% by mass.

The cobalt has a percentage content in the total mass of the chromium and the cobalt of preferably at least 40% by mass and no greater than 60% by mass, and more preferably at least 50% by mass and no greater than 55% by mass.

The chromium contained in the plating layer 35 is preferably trivalent chromium. When the plating layer 35 contains trivalent chromium, the trivalent chromium may be contained in a state of an oxide ($Cr_2O_3$), for example. Preferably, the plating layer 35 does not substantially contain hexavalent chromium from an environment point of view. The content of the hexavalent chromium in the plating layer 35 is preferably no greater than 0.01 ppm, and more preferably 0.00 ppm.

In the example illustrated in FIGS. 2 to 4, the plating layer 35 is a single layer. However, the plating layer 35 may be multilayered (e.g., two layers). The plating layer has a thickness of preferably no greater than 5.0 μm, more preferably no greater than 3.0 μm, further preferably no greater than 1.0 μm, and further more preferably no greater than 0.3 μm. The thickness of the plating layer 35 is at least 0.1 μm, for example.

The development device of the first embodiment has been described so far with reference to FIGS. 1 to 4. However, the development device of the first embodiment is not limited to that illustrated in FIGS. 1 to 4, and can be practiced with various alterations.

<Developer>

The developer included in the development device of the first embodiment is described below further in detail. The developer contains a toner. The toner includes toner particles. The toner particles each include a toner mother particle and external additive particles. The external additive particles are attached to the surface of the toner mother particle. The developer is a one-component magnetic developer, for example. When the developer is a one-component magnetic developer, the developer does not contain a carrier and is constituted by the toner. That is, when the developer is one-component magnetic developer, the developer contains only the toner. The toner particles are positively chargeable, for example.

Figure 5:
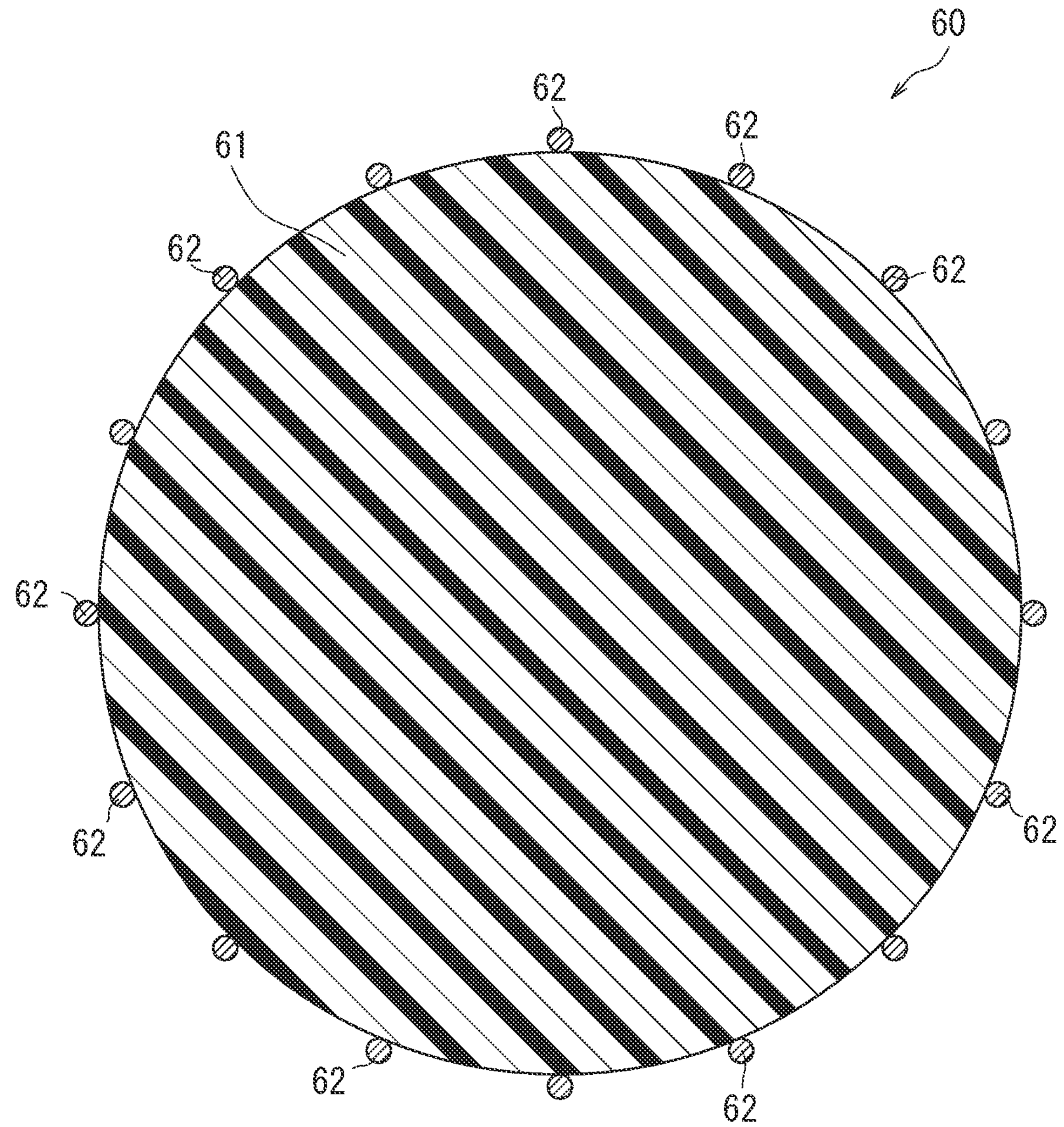
FIG. 5 is a diagram illustrating an example of the structure of a toner particle that is included in a toner contained in a developer accommodated in an accommodation section of the development device illustrated in FIG. 1.

The structure of the toner particles is described below with reference to FIG. 5. FIG. 5 is a diagram illustrating the structure of a toner particle 60 that is an example of the toner particles. The toner particle 60 is included in the toner of the developer D accommodated in the accommodation section 20 of the development device 1 illustrated in FIG. 1.

The toner particle 60 illustrated in FIG. 5 includes a toner mother particle 61 and external additive particles 62. The toner mother particle 61 contains a binder resin and a magnetic powder. The external additive particles 62 are attached to the surface of the toner mother particle 61. The external additive particles 62 include the specific alumina particles (i.e., alumina particles with surfaces that are hydrophobized). The toner mother particles 61 have a volume median diameter ($D_{50}$) of at least 4.0 μm and no greater than 9.0 μm.

One example of the structure of the toner particle 60 has been described so far with reference to FIG. 5. However, the toner particles are not limited to the toner particle 60 illustrated in FIG. 5. For example, the toner mother particles may be particles with shell layers. Alternatively or additionally, the external additive particles may further include external additive particles (also referred to below as additional external additive particles) other than the specific alumina particles.

The elements of the toner particles are described next. The toner mother particles of the toner particles contain a binder resin and a magnetic powder. The toner mother particles may further contain an internal additive (e.g., at least one of a releasing agent and a charge control agent) as necessary besides the binder resin and the magnetic powder. Note that the toner mother particles may further contain a known additive besides the binder resin, the magnetic powder, the releasing agent, and the charge control agent. The following describes the external additive particles of the toner particles, and the binder resin, magnetic powder, releasing agent, and charge control agent contained in the toner mother particles.

(External Additive Particles)

The external additive particles include the specific alumina particles. The alumina of the specific alumina particles has high positive chargeability. Therefore, the toner can be charged enough to the desired amount of charge upon contact of the toner particles including the specific alumina particles as the external additive particles with the surface of the sleeve. Furthermore, the surfaces of the specific alumina particles are hydrophobized (e.g., subjected to hydrophobic treatment). As a result of the surfaces of the specific alumina particles being hydrophobized, the toner is less affected by humidity and can be charged enough to the desired amount of charge.

The specific alumina particles have a degree of hydrophobicity of preferably at least 25% and no greater than 45%, and more preferably at least 30% and no greater than 40%. As a result of the degree of the hydrophobicity of the specific alumina particles being set to at least 25% and no greater than 45%, the toner can be charged enough to the desired amount of charge. As a result, images with desired image density can be formed even when printing many sheets. The degree of hydrophobicity can be measured by the methanol wettability method. Details of the methanol wettability method are described later in Examples.

The specific alumina particles preferably have a hydrophobic group derived from a hydrophobizing agent on the surfaces thereof. Examples of the hydrophobizing agent include a titanate coupling agent, an aluminate coupling agent, a silane coupling agent, and silicon oil.

The hydrophobizing agent is preferably a titanate coupling agent. That is, the specific alumina particles preferably have a hydrophobic group derived from a titanate coupling agent on the surfaces thereof. The titanate coupling agent contains a titanium element. Therefore, the titanate coupling agent can impart further chargeability, in addition to hydrophobicity, to the alumina particles.

The titanate coupling agent is a titanium compound having a hydrolyzable hydrophilic group and a hydrophobic group. When the surfaces of alumina particles are subjected to hydrophobizing treatment with a titanate coupling agent having a hydrolyzable hydrophilic group and a hydrophobic group, the hydrophobic group is provided on the surfaces of the alumina particles. For more details, when the surfaces of alumina particles are treated with a titanate coupling agent having a hydrolyzable hydrophilic group and a hydrophobic group, a hydroxyl group produced by hydrolysis of the hydrolyzable hydrophilic group undergoes dehydration condensation reaction with a hydroxyl group present on the surfaces of the alumina particles. Through the above reaction, the titanate coupling agent having the hydrophobic group and the alumina particles are chemically bonded to each other to provide the hydrophobic group to the surfaces of the alumina particles.

The hydrophobic group of the titanate coupling agent is preferably an alkyl group with a carbon number of at least 8 and no greater than 20, more preferably an alkyl group with a carbon number of at least 13 and no greater than 20, and further preferably an alkyl group with a carbon number of at least 15 and no greater than 20.

The specific alumina particles have a number average primary particle diameter of preferably at least 0.1 μm and no greater than 1.0 μm, and more preferably at least 0.1 μm and no greater than 0.5 μm.

The external additive particles may include only the specific alumina particles. However, the external additive particles as an external additive may include additional external additive particles as necessary. The specific alumina particles have a percentage content in the external additive particles of preferably at least 20% by mass and no greater than 60% by mass, and more preferably at least 30% by mass and no greater than 50% by mass. Examples of the additional external additive particles include inorganic particles other than the specific alumina particles, and more specific examples include silica particles and titanium oxide particles.

In terms of sufficiently exhibiting the function of the external additive while inhibiting the external additive from falling off from the toner mother particles, the content of the external additive (external additive particles) in the toner particles is preferably at least 0.1 parts by mass and no greater than 10.0 parts by mass to 100 parts by mass of the toner mother particles.

(Binder Resin)

In order that the toner has excellent low-temperature fixability, the toner mother particles preferably contain a thermoplastic resin as the binder resin, and more preferably contain a thermoplastic resin at a percentage content of at least 85% by mass to the total of the binder resin. Examples of the thermoplastic resin include styrene resins, acrylic resins, olefin resins (e.g., polyethylene resin and polypropylene resin), vinyl resins (e.g., vinyl chloride resin, polyvinyl alcohol, vinyl ether resin, and N-vinyl resin), polyester resins, polyamide resins, and urethane resins. Alternatively, a copolymer of any of these resins, that is, a copolymer (e.g., styrene-acrylic resin or styrene-butadiene resin) in which any repeating unit has been introduced into any of the above resins can be used as the binder resin.

In order that the toner has excellent low-temperature fixability, the binder resin preferably contains styrene-acrylic resin. Preferably, the styrene-acrylic resin has a percentage content in the binder resin of at least 80% by mass and no greater than 100% by mass.

The styrene-acrylic resin includes as repeating units at least one repeating unit derived from styrene or a derivative thereof and at least one repeating unit derived from (meth)acrylic acid or a derivative thereof, for example.

Examples of a first monomer that can form the repeating unit derived from styrene or a derivative thereof include styrene, α-methylstyrene, and vinyltoluene. The first monomer is preferably styrene. The percentage content of the repeating unit derived from styrene or a derivative thereof to all repeating units included in the binder resin is preferably at least 60.0% by mass and no greater than 90.0% by mass, and more preferably at least 75.0% by mass and no greater than 85.0% by mass.

Examples of the repeating unit derived from (meth)acrylic acid or a derivative thereof include a repeating unit derived from (meth)acrylic acid having one vinyl group or a derivative thereof, and a repeating unit derived from (meth)acrylic acid derivative having at least two vinyl groups.

Examples of a second monomer that can form a repeating unit derived from a (meth)acrylic acid having one vinyl group or a derivative thereof include (meth)acrylic acid and (meth)acrylic acid alkyl ester. The (meth)acrylic acid alkyl ester is preferably (meth)acrylic acid alkyl ester having an alkyl group with a carbon number of at least 1 and no greater than 8, more preferably (meth)acrylic acid alkyl ester having an alkyl group with a carbon number of at least 1 and no greater than 4, further preferably butyl (meth)acrylate, and particularly preferably butyl acrylate. The percentage content of the repeating unit derived from (meth)acrylic acid having one vinyl group or a derivative thereof to all the repeating units included in the binder resin is preferably at least 8.0% by mass and no greater than 40.0% by mass, and more preferably at least 16.0% by mass and no greater than 25.0% by mass.

Examples of a third monomer that can form a repeating unit derived from a (meth)acrylic acid derivative having two or more vinyl groups include bisphenol F ethylene oxide modified diacrylate, bisphenol A ethylene oxide modified diacrylate acid, polypropylene glycol diacrylt, polyethylene glycol diacrylate, trimethylolpropane triacrylate, propylene oxide modified trimethylolpropane triacrylate, and ethylene oxide modified trimethylolpropane triacrylate. The (meth)acrylic acid derivative having two or more vinyl groups is preferably a (meth)acrylic acid derivative having two or three vinyl groups, more preferably a (meth)acrylic acid derivative having three vinyl groups, and further preferably ethylene oxide modified trimethylolpropane triacrylate. The ethylene oxide modified trimethylolpropane triacrylate has an average number of moles added of preferably at least 1 and no greater than 5, and more preferably at least 2 and no greater than 4. The (meth)acrylic acid derivative having two or more vinyl groups has a percentage content to all the repeating units included in the binder resin of preferably at least 0.1% by mass and no greater than 2.0% by mass, and more preferably at least 0.1% by mass and no greater than 1.0% by mass.

The styrene-acrylic resin is preferably a styrene-acrylic resin formed with styrene, butyl acrylate, and ethylene oxide modified trimethylolpropane triacrylate.

(Magnetic Powder)

Examples of the material of the magnetic powder include ferromagnetic metals (e.g., iron, cobalt, and nickel) and alloys thereof, ferromagnetic metal oxides (e.g., ferrite, magnetite, and chromium dioxide), and materials subjected to ferromagnetization (e.g., carbon materials rendered ferromagnetic by thermal treatment).

The magnetic powder has a content in the toner mother particles of preferably at least 30 parts by mass and no greater than 150 parts by mass to 100 parts by mass of the binder resin, and more preferably at least 50 parts by mass and no greater than 100 parts by mass.

Due to the magnetic powder functioning as a black colorant, the toner mother particles may not contain any other colorant. However, the toner mother particles may further contain a black colorant. An example of the black colorant is carbon black. Alternatively, the black colorant may be a colorant adjusted to a black color using at least one of a yellow colorant, a magenta colorant, and a cyan colorant.

(Releasing Agent)

The toner mother particles may contain a releasing agent. The releasing agent is used to give the toner excellent offset resistance, for example. In order that the toner has excellent offset resistance, the releasing agent has preferably a content in the toner mother particles of at least 1 part by mass and no greater than 20 parts by mass to 100 parts by mass of the binder resin.

Example of the releasing agent include ester waxes, polyolefin waxes (e.g., polyethylene wax and polypropylene wax), microcrystalline wax, fluororesin wax, Fischer-Tropsch wax, paraffin wax, candelilla wax, montan wax, and castor wax. Examples of the ester waxes include natural ester waxes (e.g., carnauba wax and rice wax) and synthetic ester waxes. The releasing agent is preferably Fischer-Tropsch wax.

(Charge Control Agent)

The toner mother particles may contain a charge control agent. The charge control agent is used to give the toner excellent charge stability and a charge rise characteristic, for example. The charge rise characteristic of the toner is an indicator as to whether the toner can be charged to a specific charge level in a short period of time.

When the toner mother particles contain a positively chargeable charge control agent, cationicity (positive chargeability) of the toner mother particles can be increased. When the toner mother particles contain a negatively chargeable charge control agent by contrast, anionicity (negative chargeability) of the toner mother particles can be increased.

Examples of the positively chargeable charge control agent include azine compounds, direct dyes, acid dyes, alkoxylated amines, alkylamides, quaternary ammonium salts, and resins having a quaternary ammonium cation group. The charge control agent is preferably an azine compound or a resin having a quaternary ammonium cationic group.

Examples of the azine compounds include pyridazine, pyrimidine, pyrazine, 1,2-oxazine, 1,3-oxazine, 1,4-oxazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline.

In terms of giving the toner excellent charge stability, the content of the charge control agent in the toner mother particles is preferably at least 0.1 parts by mass and no greater than 20 parts by mass to 100 parts by mass of the binder resin.

(Developer Production Method)

An example of production methods of the developer is described next. First, the binder resin, the magnetic powder, and an optional internal additive are mixed to obtain a mixture. The mixture is melt-kneaded to obtain a melt-kneaded product. The melt-kneaded product is pulverized to obtain a pulverized product. The pulverized product is classified to obtain toner mother particles. The toner mother particles, the external additive particles (the specific alumina particles and optional additional external additive particles) are mixed using a mixer. Through mixing, the external additive particles are attached to the surfaces of the toner mother particles to obtain a toner including toner particles. The resultant toner can be used as a one-component developer. Note that mixing with the external additive particles is preferably carried out under a condition that the external additive particles are not completely buried in the toner mother particles. The external additive particles are attached to the surfaces of the toner mother particles by physical bond (physical force) rather than chemical bond.

Second Embodiment: Image Forming Apparatus

The following describes an image forming apparatus according to a second embodiment of the present disclosure. The image forming apparatus of the second embodiment includes the development device of the first embodiment. Therefore, the image forming apparatus of the second embodiment can form images with desired image density under less variation in developer transport amount even when printing many sheets for the same reasons as described in the first embodiment.

Figure 6:
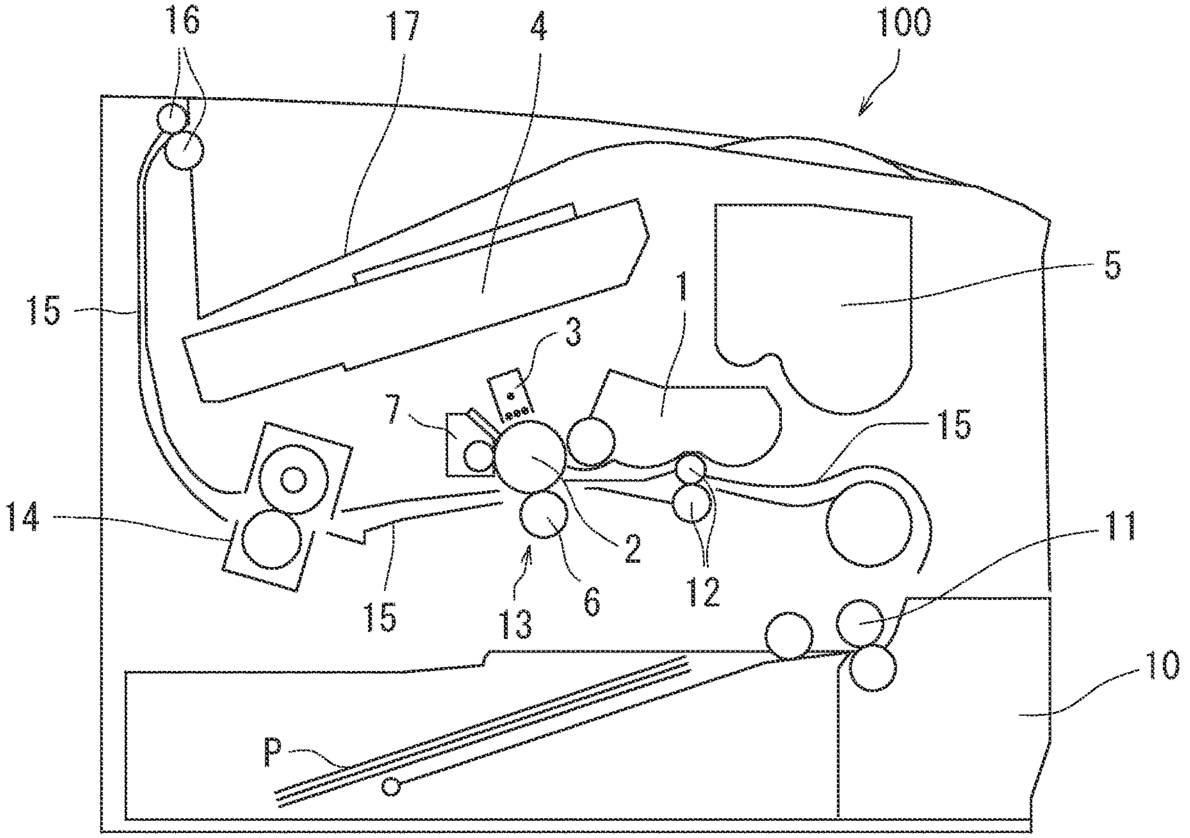
FIG. 6 is a diagram illustrating an example of an image forming apparatus according to a second embodiment of the present disclosure.

In the following, an image forming apparatus 100, which is an example of the image forming apparatus of the second embodiment, is described with reference to FIG. 6. FIG. 6 is a diagram illustrating the image forming apparatus 100.

The image forming apparatus 100 illustrated in FIG. 6 includes a sheet cassette 10, a sheet feed roller 11, a registration roller pair 12, an image formation section 13, a fixing section 14, a sheet conveyance path 15, an ejection roller pair 16, and an exit tray 17. The sheet conveyance path 15 extends from above the sheet cassette 10 to the exit tray 17. Along the sheet conveyance path 15, the sheet feed roller 11, the registration roller pair 12, the image formation section 13, the fixing section 14, and the ejection roller pair 16 are arranged in the stated order from upstream in terms of a conveyance direction of a sheet P.

The sheet cassette 10 is provided in the lower part of the main body of the image forming apparatus 100. The sheet cassette 10 accommodates at least one sheet P of paper.

The sheet feed roller 11 feeds the sheet P from the sheet cassette 10. The sheet P fed from the sheet feed roller 11 is conveyed to the registration roller pair 12.

The registration roller pair 12 temporarily stops the sheet P and then forwards the sheet P to the image formation section 13.

The image formation section 13 includes an image bearing member 2, a charger 3, a light exposure device 4, a development device 1, a developer container 5, a transfer roller 6, and a cleaner 7. The charger 3, the light exposure device 4, the development device 1, the transfer roller 6, and the cleaner 7 are arranged around the image bearing member 2. The development device 1 is the development device described in the first embodiment. The developer container 5 is disposed above the development device 1 and replenishes the development device 1 with a developer D.

The image bearing member 2 is axially supported in a rotatable manner in the clockwise direction in FIG. 1. The image bearing member 2 is a photosensitive drum for example. Application of a specific voltage to the charger 3 uniformly charges the surface of the image bearing member 2. Next, light irradiation by the light exposure device 4 forms an electrostatic latent image on the surface (e.g., the circumferential surface) of the image bearing member 2. The electrostatic latent image is formed based on input image data. The development device 1 supplies the developer D constituted by the toner including the toner particles 60 to the electrostatic latent image on the surface of the image bearing member 2 to form a toner image on the surface of the image bearing member 2. In the manner described above, the development device 1 develops the electrostatic latent image into the toner image with the developer D. Thus, the image bearing member 2 carries the toner image.

Next, the sheet P is supplied from the registration roller pair 12 to a gap (transfer point) between the image bearing member 2 and the transfer roller 6. The transfer roller 6 transfers the toner image on the surface of the image bearing member 2 to the sheet P. The sheet P with the toner image transferred thereto is conveyed to the fixing section 14. The fixing section 14 performs application of either or both heat and pressure (specifically, applies heat, pressure, or both heat and pressure) to the sheet P with the toner image transferred thereto. Through application of at least one of heat or pressure to the sheet P with the toner image transferred thereto, the toner image is fixed to the sheet P, thereby forming an image on the sheet P. The ejection roller pair 16 ejects the sheet P with the image formed thereon onto the exit tray 17. Developer D remaining on the surface of the image bearing member 2 after transfer is collected by the cleaner 7. The image bearing member 2 is re-charged by the charger 3, and image formation is performed in the same manner as above.

In the example illustrated in FIG. 6, the image bearing member 2 and the sleeve 33 of the developer bearing member 23 included in the development device 1 are separate from each other. Furthermore, the toner particles 60 carried on the surface of the sleeve 33 is out of contact with the image bearing member 2. That is, the image forming apparatus 100 employs the toner projection development.

The image forming apparatus 100, which is an example of the image forming apparatus of the second embodiment, has been described so far with reference to FIG. 6. However, the image forming apparatus of the second embodiment is not limited to the image forming apparatus 100. For example, the image forming apparatus of the second embodiment may employ a development method (e.g., the contact development) other than the toner projection development. That is, the image bearing member may be come in contact with the surface of the sleeve and the toner particles carried on the surface of the sleeve in the image forming apparatus of the second embodiment. The image forming apparatus of the second embodiment has been described so far.

Furthermore, the present application also discloses the following development method and image formation method. That is, in the development method disclosed in the present application, electrostatic latent image development is performed by developing an electrostatic latent image into a toner image with the developer using the development device. The image formation method disclosed in the present application include developing an electrostatic latent image into a toner image with a developer using a development device. The development device is the development device described in the first embodiment. Therefore, according to the image formation method disclosed in the present application, images with desired image density can be formed under less variation in developer transport amount even when printing many sheets for the same reasons as described in the first embodiment.

EXAMPLES

The following describes the present disclosure further specifically using examples. However, the present disclosure is not limited to the scope of the examples.

[Measurement Methods]

Measurement methods of the respective physical property values are described first.

<Ten-Point Average Roughness Rz>

The ten-point average roughness Rz of metal substrates was measured using a surface roughness profilometer ("SURFCOM (registered Japanese trademark) 1500DX", product of TOKYO SEIMITSU CO., LTD.) compliant with the Japanese Industrial Standards (JIS) B 0601:2001.

<Degree of Hydrophobicity>

The degree of hydrophobicity of aluminum particles was measured by the methanol wettability method described below. First, 0.1 g of the aluminum particles were dispersed in 25 mL of pure water in an environment at a temperature of 23° C. to prepare a dispersion. Next, methanol was dripped into the dispersion until all the aluminum particles got wet and settled (total sedimentation). Thereafter, a degree of hydrophobicity of the aluminum particles was calculated using the following expression based on the amount (unit: mL) of the dripped methanol required for total sedimentation of the aluminum particles.

(Degree of hydrophobicity [%])=100×(amount of dripped methanol)/((amount of dripped methanol)+25 mL)

[Sleeve Production]

Sleeves (S-A) to (S-C) were produced by the following methods. The configuration of each of these sleeves are shown in Table 1.

TABLE 1

| | Sleeve | S-A | S-B | S-C |
|---|---|---|---|---|
| Metal substrate | Material | Al | Al | Al |
| | Blasting | Done | Done | Done |
| | Rz [μm] | 7.5 | 7.5 | 7.5 |
| | Outer diameter [mm] | 20 | 20 | 20 |
| | Plating layer | None | Cr(III)—Co | Inner layer Ni/ outer layer Cr |

The terms in Table 1 mean as follows. "Rz" means a ten-point average roughness Rz of a corresponding metal substrate. "Outer diameter" means the outer diameter of a corresponding sleeve. "Al" means aluminum. "Cr(III)-Co" means a plating layer of a mixture of trivalent chromium and cobalt. "Inner layer Ni/outer layer Cr" means a combination of a nickel plating layer covering the outer circumferential surface of a corresponding metal substrate and a chromium plating layer covering the outer circumferential surface of the nickel plating layer.

<Sleeve (S-A)>

A metal substrate was obtained by carrying out bead blasting on the outer circumferential surface of a cylindrical aluminum plate with an outer diameter of 20 mm. In the bead blasting, No. 200 silicon carbide beads and glass beads were used as abrasive grains for blasting use. The treatment intensity of the bead blasting was adjusted so that the ten-point average roughness Rz of the outer circumferential surface of the metal substrate reached 7.5 μm. The resultant metal substrate was used as a sleeve (S-A).

<Sleeve (S-B)>

A metal substrate with an outer circumferential surface having a ten-point average roughness Rz of 7.5 μm was produced according to the same method as that for producing the sleeve (S-A). Next, a plating solution (L1) was obtained by mixing chromium nitrate (Cr), cobalt nitrate (Co), formic acid, and water. The amount of each component added in the plating solution (L1) was adjusted so that the concentration of the chromium nitrate reached 4 g/L, the concentration of the cobalt nitrate reached 3 g/L, and the concentration of the formic acid reached 20 g/L. The pH of the plating solution (L1) was adjusted to 4 with sodium hydroxide. The metal substrate was immersed in the plating solution (L1) at the adjusted pH for 60 seconds for electroless plating under a condition of a solution temperature of 30° C. Through the above, a plating layer (thickness 0.2 μm) of trivalent chromium and cobalt was formed on the outer circumferential surface of the metal substrate. As a result, a sleeve (S-B) was obtained that included the metal substrate and the plating layer covering the outer circumferential surface of the metal substrate. The plating layer of the sleeve (S-B) was a single-layer plating layer of trivalent chromium and cobalt.

<Sleeve (S-C)>

A metal substrate with an outer circumferential surface having a ten-point average roughness Rz of 7.5 μm was produced according to the same method as that for producing the sleeve (S-A). Next, nickel (Ni) was immersed in a hypophosphorous acid aqueous solution to prepare a plating solution (L2). The pH of the plating solution (L2) was adjusted to 4.5 to 5.5. The metal substrate was immersed in the plating solution (L2) at the adjusted pH for 15 minutes for electroless plating under a condition of a solution temperature of 85° C. to 95° C. Through the above, a nickel plating layer (thickness 4.5 μm) was formed on the outer circumferential surface of the metal substrate. The nickel plating layer contained nickel in a percentage content of 90% by mass and phosphorous in a percentage content of 10% by mass.

Next, a plating solution (L3) capable of forming a trivalent chromium (Cr) plating layer was prepared. The pH of the plating solution (L3) was adjusted to 3 to 4. Using the plating solution (L3) at the adjusted pH, electrolytic plating was carried out on the metal substrate with the nickel plating layer formed thereon for 4 minutes under conditions of a solution temperature of 35° C. to 55° C. and an application voltage of 5 V. Through the above, a chromium plating layer (thickness 0.5 μm) covering the outer circumferential surface of the nickel plating layer was formed. As a result, a sleeve (S-C) was obtained that included the metal substrate, the nickel plating layer covering the outer circumferential surface of the metal substrate, and the chromium plating layer covering the outer circumferential surface of the nickel plating layer.

Note that the plating layers of the sleeves (S-B) to (S-C) each were thin relative to the ten-point average roughness Rz of the outer circumferential surface of a corresponding one of the metal substrates. As such, the values for the ten-point average roughness Rz of the outer circumferential surfaces of the metal substrates of the sleeves (S-B) to (S-C) can be considered to be approximately the same as the values for the ten-point average roughness Rz of the outer circumferential surfaces of the corresponding sleeves.

[Binder Resin Preparation]

Styrene-acrylic resin (R) to be used as a binder resin in developer preparation was prepared by the following method. First, 200.0 parts by mass of ion exchange water and 0.2 parts by mass of a nonionic dispersant were added into a reaction vessel. The nonionic dispersant used was "CURARAY POVAL (registered Japanese trademark) PVA235" produced by Kuraray Co., Ltd. Separately, 79.2 parts by mass of styrene, 20.0 parts by mass of n-butyl acrylate, and 0.8 parts by mass of ethylene oxide modified trimethylolpropane triacrylate were mixed to obtain a mixture. The ethylene oxide modified trimethylolpropane triacrylate used was "Light Acrylic Acid TMP-3EO-A" (average number of moles added of ethylene oxide: 3) produced by Kyoeisha Chemical Co., Ltd. The resultant mixture and 2.0 parts by mass of benzoyl peroxide being a polymerization initiator were added into the reaction vessel. The contents of the reaction vessel were kept at 130° C. for 2 hours under stirring. In the manner described above, suspension polymerization was allowed to proceed to obtain a suspension containing a copolymer. The resultant suspension was cooled to 30° C., dehydrated using a centrifugal dehydrator, and dried at 50° C. for 24 hours. Through the above, the styrene-acrylic resin (R) being a copolymer was obtained.

[Alumina Particle Preparation]

Alumina particles (P1) to (P3) used as external additives for developer preparation were prepared by the following methods.

<Alumina Particles (P1)>

Using a mixer ("NANOPERSION PICCOLO", product of KAWATA MFG. CO., LTD.), 300 g of alumina particles and 30 g of a titanate coupling agent were mixed for 1 hour at 6000 rpm and 80° C. The alumina particles used were "AKP-50" produced by SUMITOMO CHEMICAL COMPANY, LIMITED. The titanate coupling agent used was "PLENACT (registered Japanese trademark) TTS" (titanate coupling agent having an alkyl group with a carbon number of 17 as a hydrophobic group) produced by Ajinomoto Co., Inc. The resultant mixture was dried at 110° C. for 12 hours. The dried mixture was pulverized using a pulverizer at a pulverization pressure of 0.6 MPa. Through the above, alumina particles (P1) with a number average primary particle diameter of 0.22 μm and a degree of hydrophobicity of 35% were obtained.

<Alumina Particles (P2)>

Alumina particles (P2) were obtained according to the same method as that for preparing the alumina particles (P1) in all aspects other than change of the amount of the titanate coupling agent added from 30 g to 22.5 g. The alumina particles (P2) had a degree of hydrophobicity of 25%.

<Alumina Particles (P3)>

Alumina particles (P2) were obtained according to the same method as that for preparing the alumina particles (P1) in all aspects other than change of the amount of the titanate coupling agent added from 30 g to 37.5 g. The alumina particles (P3) had a degree of hydrophobicity of 45%.

[Developer Preparation]

Developers (D-1) to (D-4) were prepared by the following methods. Table 2 shows the types and degrees of hydrophobicity of the alumina particles used for preparing these developers.

TABLE 2

| Developer | Alumina particles | Degree of hydrophobicity [%] |
|---|---|---|
| D-1 | P1 | 35 |
| D-2 | — | — |
| D-3 | P2 | 25 |
| D-4 | P3 | 45 |

<Developer (D-1)>

(Toner Mother Particle Formation)

An FM mixer ("MODEL FM-10", product of NIPPON COKE & ENGINEERING CO., LTD.) was used to mix 100.0 parts by mass of the styrene-acrylic resin (R) being a binder resin, 2.0 parts by mass of a first charge control agent, 4.0 parts by mass of a second charge control agent, 4.0 parts by mass of a releasing agent, and 77.3 parts by mass of a magnetic powder. The first charge control agent used was an azine compound ("BONTRON (registered Japanese trademark) N-71", product of ORIENT CHEMICAL INDUSTRIES, Co., Ltd.). The second charge control agent used was a resin ("ACRYBASE (registered Japanese trademark) FCA-201-PS", product of FUJIKURA KASEI CO., LTD.) having a quaternary ammonium cationic group. The releasing agent used was Fischer-Tropsch wax ("SX-105", product of Shell Japan Limited). The magnetic powder used was a powder ("TN-15", product of NIPPON COKE & ENGINEERING CO., LTD.) of magnetite particles. Next, the resultant mixture was melt-kneaded using a two-axis extruder ("TEM-26SS", product of SHIBAURA MACHINE CO., LTD.) to obtain a melt-kneaded product. The melt-kneaded product was cooled. Next, the cooled melt-kneaded product was coarsely pulverized using a pulverizer ("ROTOPLEX (registered Japanese trademark)", product of TOA MACHINERY MFG. CO., LTD.) until the volume median diameter ($D_{50}$) thereof reached approximately 2 mm. Next, the resultant coarsely pulverized product was finely pulverized using a turbo mill ("MODEL RS", product of FREUND-TURBO CORPORATION). The finely pulverized product was classified using an air classifier ("EJ-L-3 LABO MODEL", product of Nittetsu Mining Co., Ltd.) to obtain toner mother particles. The toner mother particles had a volume median diameter ($D_{50}$) of 8.0 μm.

(External Additive Addition)

Using an FM mixer ("MODEL FM-10", product of NIPPON COKE & ENGINEERING CO., LTD.), 100.0 parts by mass of the resultant toner mother particles, 1.5 parts by mass of positively chargeable silica particles being an external additive, and 1.0 parts by mass of the alumina particles (P1) being an external additive were mixed at a rotational speed of 3500 rpm for 5 minutes. The positively chargeable silica particles used were "CAB-O-SIL TG-308F" produced by Cabot Corporation. Through the mixing, the external additives were attached to the surfaces of the toner mother particles to obtain a toner including a large number of toner particles. Thus, a developer (D-1) constituted by the toner was obtained. The developer (D-1) was a magnetic one-component magnetic developer.

<Developer (D-2)>

A developer (D-2) being a one-component magnetic developer was obtained according to the same method as that for preparing the developer (D-1) in all aspects other than that the alumina particles (Pb) were not used in the external additive addition.

<Developers (D-3) and (D-4)>

Developers (D-3) and (D-4) each being a one-component magnetic developer were obtained according to the same method as that for preparing the developer (D-1) in all aspects other than that the alumina particles shown in Table 2 were used in place of the alumina particles (P1) in the external additive addition.

[Development Device]

Development devices (A-1) to (A-5) of Examples and development devices (B-1) to (B-3) of Comparative Examples were prepared by the following methods. Table 3 described later shows the sleeve linear velocities, sleeve types, and developer types of these development devices.

<Development Device (A-1)>

A development device was taken out of a monochrome multifunction peripheral ("TASKalfa 255", product of KYOCERA Document Solutions Japan Inc.). The development device employed the magnetic one-component development and included an accommodation section and a developer bearing member. The developer bearing member included a magnetic member and a sleeve provided around the magnetic member rotatably around the magnetic member. The sleeve was removed from the development device and the sleeve (S-B) was mounted in its place. Furthermore, the developer (D-1) was charged into the accommodation section of the development device. Thus, a development device (A-1) was obtained. The development device (A-1) was mounted in the monochrome multifunction peripheral, and the resultant apparatus was taken as an evaluation apparatus used for later-described evaluation. Furthermore, the linear velocity of the sleeve in the evaluation apparatus with the development device (A-1) mounted therein was set to 200 mm/sec.

<Development Devices (A-2) to (A-5) and (B-1) to (B-3)>

Development devices (A-2) to (A-5) and (B-1) to (B-3) were obtained according to the same method as that for preparing the development device (A-1) in all aspects other than that the type of the sleeve and the type of the developer were changed as shown below in Table 3. Any of the development devices (A-2) to (A-5) and (B-1) to (B-3) was mounted in the monochrome multifunction peripheral, and the resultant apparatus was taken as an evaluation apparatus used for later-described evaluation. Furthermore, the linear velocity of the sleeve in the evaluation apparatus with any of the development devices (A-2) to (A-5) and (B-1) to (B-3) mounted therein was set as shown in Table 3.

[Evaluation]

With respect to each of the evaluation apparatuses including a corresponding one of the development devices (A-1) to (A-5) and (B-1) to (B-3), on-sleeve developer amount ratio and image density were evaluated by the following methods. Evaluation results are shown in Table 3 described later. Of the evaluation results in Table 3, (NG) is indicated for only evaluation results rated as poor.

<Image Density>

Evaluation of image density was carried out in an environment at a temperature of 22.5° C. and a relative humidity of 50%. Using the evaluation apparatus, an image I (solid image) was printed on one sheet of paper. Next, an image II (character pattern image with a printing rate of 6%) was printed consecutively on 300,000 sheets of paper using the evaluation apparatus. After the 300,000-sheet printing, the image I (solid image) was printed again on one sheet of paper using the evaluation apparatus. The resultant sheet was taken as an evaluation sheet. The image density (ID) of the image I printed on the evaluation sheet was measured using a reflectance densitometer ("RD914", product of X-Rite Inc.). The measured image density was rated according to the following criteria.

(Criteria of Image Density)

Good: ID of at least 1.10

Poor (NG): ID of less than 1.10

<On-Sleeve Developer Amount Ratio>

For evaluation of the on-sleeve developer amount ratio, a compact toner draw-off charge measurement system ("MODEL 212HS", product of TREK, INC.) was used. Developer (e.g., toner being a one-component magnetic developer) on the sleeve was sucked using the compact toner draw-off charge measurement system after the first printing of the image I and before the printing of the image II in the above image density evaluation. A mass Y (unit: g) of the sucked developer and an area Z (unit: $m^2$) of a region of the outer circumferential surface of the sleeve where the developer had been sucked were measured. An initial developer amount (unit: $g/m^2$) per unit area was obtained using an equation "developer amount per unit area=Y/Z".

After the second printing of the image I in the image density evaluation, the developer amount (unit: $g/m^2$) per unit area after the 300,000-sheet printing was measured according to the same method as that for measuring the initial developer amount per unit area.

Next, an on-sleeve developer amount ratio was calculated using an equation "(on-sleeve developer amount ratio)=(developer amount per unit area after 300,000-sheet printing)/(initial developer amount per unit area). The on-sleeve developer amount ratio was rated according to the following criteria. Note that the developer amount per unit area corresponds to a developer transport amount (amount of developer transported by the developer bearing member). Therefore, an on-sleeve developer amount ratio (a ratio of an amount of developer on the sleeve of the developer bearing member) being closer to 1.00 indicates that the developer transport amount can be maintained more without decreasing, even when printing many sheets. That is, it indicates that variation in developer transport amount is small.

(Criteria of On-Sleeve Developer Amount Ratio)

Good: on-sleeve developer amount ratio of at least 0.70

Poor (NG): on-sleeve developer amount ratio of less than 0.70

TABLE 3

| | Development device | Sleeve linear velocity [mm/sec] | Sleeve | Developer | On-sleeve developer amount ratio | ID (After 300K printing) |
|---|---|---|---|---|---|---|
| Example 1 | A-1 | 200 | S-B | D-1 | 0.88 | 1.25 |
| Example 2 | A-2 | 100 | S-B | D-1 | 0.91 | 1.31 |
| Example 3 | A-3 | 250 | S-B | D-1 | 0.84 | 1.22 |
| Example 4 | A-4 | 200 | S-B | D-3 | 0.80 | 1.18 |
| Example 5 | A-5 | 200 | S-B | D-4 | 0.96 | 1.22 |
| Comparative Example 1 | B-1 | 200 | S-A | D-1 | 0.62 (NG) | 0.98 (NG) |
| Comparative Example 2 | B-2 | 200 | S-B | D-2 | 0.77 | 1.08 (NG) |
| Comparative Example 3 | B-3 | 200 | S-C | D-1 | 0.66 (NG) | 1.20 |

As shown in Table 1, the sleeve (S-A) of the developer bearing member included in the development device (B-1) did not include a plating layer. As shown in Table 3, the development device (B-1) was rated as poor in both the on-sleeve developer amount ratio evaluation and the image density evaluation.

As shown in Table 2, the toner particles contained in the developer (D-2) accommodated in the accommodation section of the development device (B-2) included toner mother particles to which the specific alumina particles had not been externally added. As shown in Table 3, the development device (B-2) was rated as poor in the image density evaluation.

As shown in Table 1, the sleeve (S-C) of the developer bearing member included in the development device (B-3) included a plating layer that did not contain cobalt. As shown in Table 3, the development device (B-3) was rated as poor in the on-sleeve developer amount ratio evaluation.

As shown in Tables 1 and 2, the development devices (A-1) to (A-5) each had the following features. That is, each of the development devices included an accommodation section and a developer bearing member. The developer bearing member included a magnetic member and a sleeve. The sleeve included a metal substrate with a surface having projections and recesses formed thereon and a plating layer covering the surface of the metal substrate. The plating layer contained chromium and cobalt. The developer contained toner particles. The toner particles each included a toner mother particle and external additive particles attached to the surface of the toner mother particle. The toner mother particles contain a binder resin and a magnetic powder. The external additive particles included the specific alumina particles. As shown in Table 3, all of the development devices (A-1) to (A-5) were rated as good in both the on-sleeve developer amount ratio evaluation and the image density evaluation.

From the above, it can be determined that the development device of the present disclosure and the image forming apparatus of the present disclosure that includes the development device can form images with desired image density under less variation in developer transport amount even when printing many sheets.

Furthermore, even when the linear velocity of the sleeve is as low as 250 mm/sec or less, each of the development devices (A-1) to (A-5) was rated as good in both the on-sleeve developer amount ratio evaluation and the image density evaluation. Therefore, it can be determined that the development device of the present disclosure and the image forming apparatus of the present disclosure that includes the development device can form images with desired image density under less variation in developer transport amount even when the linear velocity of the sleeve is as low as 250 mm/sec or less.

What is claimed is:

1. A development device comprising:

an accommodation section that accommodates a developer; and a developer bearing member that carries the developer in the accommodation section, wherein the developer bearing member includes a magnetic member and a sleeve provided around the magnetic member rotatably around the magnetic member, the sleeve includes a metal substrate with a surface having projections and recesses and a plating layer covering the surface of the metal substrate, the plating layer contains chromium and cobalt, the developer contains a toner and the toner includes toner particles, the toner particles each include a toner mother particle and external additive particles attached to a surface of the toner mother particle, the toner mother particles contain a binder resin and a magnetic powder, the external additive particles include alumina particles with surfaces that are hydrophobized, and a number-average primary particle diameter of the alumina particles is more than 0.1 μm.

2. The development device according to claim 1, wherein the alumina particles have a degree of hydrophobicity of at least 25% and no greater than 45%.

3. The development device according to claim 1, wherein the alumina particles have a hydrophobic group derived from a titanate coupling agent on the surfaces thereof.

4. The development device according to claim 1, wherein the metal substrate of the sleeve is an aluminum substrate.

5. The development device according to claim 1, wherein a linear velocity of the sleeve is no greater than 250 mm/sec.

6. An image forming apparatus comprising the development device according to claim 1.

7. A development method comprising developing, using the development device according to claim 1, an electrostatic latent image with the developer.

8. The development device according to claim 1, wherein the number-average primary particle diameter of the alumina particles is 1.0 μm or less.

* * * * *